United States Patent [19]
Okoroafor et al.

[11] Patent Number: 5,976,422
[45] Date of Patent: Nov. 2, 1999

[54] OPTICAL RESIN COMPOSITION

[75] Inventors: Michael O. Okoroafor, Export; Robert D. Herold, Monroeville; Robert A. Smith, Murrysville, all of Pa.

[73] Assignee: PPG Industries Ohio, Inc., Cleveland, Ohio

[21] Appl. No.: 09/037,108

[22] Filed: Mar. 9, 1998

[51] Int. Cl.$^6$ .............................. G02B 5/23; C08G 75/04
[52] U.S. Cl. .................. 252/586; 252/183.11; 528/373; 528/376
[58] Field of Search .............................. 252/183.11, 586; 528/373, 374, 376

[56] References Cited

U.S. PATENT DOCUMENTS

| | | | |
|---|---|---|---|
| 3,361,706 | 1/1968 | Meriwether et al. | 260/39 |
| 3,562,172 | 2/1971 | Hisatake et al. | 252/300 |
| 3,567,605 | 3/1971 | Becker | 204/158 |
| 3,578,602 | 5/1971 | Histake et al. | 252/300 |
| 4,166,043 | 8/1979 | Uhlmann et al. | 252/300 |
| 4,215,010 | 7/1980 | Hovey et al. | 252/300 |
| 4,342,668 | 8/1982 | Hovey et al. | 252/586 |
| 4,367,170 | 1/1983 | Uhlmann et al. | 252/586 |
| 4,637,698 | 1/1987 | Kwak et al. | 351/163 |
| 4,816,584 | 3/1989 | Kwak et al. | 344/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,931,219 | 6/1990 | Kwiatkowski et al. | 252/586 |
| 4,931,220 | 6/1990 | Haynes et al. | 252/586 |
| 5,047,576 | 9/1991 | Takenosita et al. | 560/125 |
| 5,066,818 | 11/1991 | Gemert et al. | 549/389 |
| 5,238,931 | 8/1993 | Yoshikawa et al. | 514/184 |
| 5,274,132 | 12/1993 | VanGemert | 549/389 |
| 5,384,077 | 1/1995 | Knowles | 252/586 |
| 5,405,958 | 4/1995 | VanGemert | 544/71 |
| 5,429,774 | 7/1995 | Kumar | 252/586 |
| 5,446,173 | 8/1995 | Kanesaki et al. | 549/13 |

FOREIGN PATENT DOCUMENTS

| | | |
|---|---|---|
| 0 562 966 | 9/1993 | European Pat. Off. . |
| 0 598 551 | 5/1994 | European Pat. Off. . |
| 0 598 552 | 5/1994 | European Pat. Off. . |
| 0 742 244 | 11/1996 | European Pat. Off. . |
| 0 802 208 | 10/1997 | European Pat. Off. . |
| 0 803 504 | 10/1997 | European Pat. Off. . |
| 62-50336 | 3/1987 | Japan . |
| 1-182314 | 7/1989 | Japan . |
| WO 96/14594 | 5/1996 | WIPO . |
| WO 96/38486 | 5/1996 | WIPO . |

OTHER PUBLICATIONS

*Techniques in Chemistry*, vol. III, "Photocromism," Chapter 3, Glenn H. Brown, Editor, John Wiley and Sons, Inc., New York, 1971.
*The Bausch & Lomb ABBE–3L Refractomerter, Operator's Manual*, cover and p. 8. Copyright 1983.
American Standard Test Method (ASTM) D 542 –95 (Nov., 1995).
ASTM D 648 –95 (Dec., 1995).
ASTM D 1003 –95 (Apr., 1995).
ASTM D 2583 –95 (Dec., 1995).

*Primary Examiner*—Shean C. Wu
*Attorney, Agent, or Firm*—Irwin M. Stein; James R. Franks

[57] ABSTRACT

Describes a polymerizable organic composition comprising at least one polymerizable monomer having at least two ethylenically unsaturated groups, e.g., divinyl benzene, and a polythiol monomer represented by the following general formula,

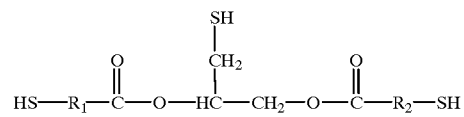

wherein $R_1$ and $R_2$ are each selected from the group consisting of straight or branched chain alkylene, e.g., methylene or ethylene, cyclic alkylene, phenylene and $C_1$–$C_9$ alkyl substituted phenylene. Optionally, a monoethylenically unsaturated monomer, e.g., phenoxyethyl methacrylate, and/or an anhydride monomer, e.g., methacrylic anhydride, may also be present. Polymerizates prepared from polymerizable organic compositions of the present invention have a refractive index of at least 1.57, an Abbe number of at least 33 and an initial Barcol hardness of at least 1. Also described are photochromic articles prepared from such compositions.

23 Claims, No Drawings

OPTICAL RESIN COMPOSITION

DESCRIPTION OF THE INVENTION

The present invention relates to polymerizable organic compositions and polymerizates therefrom having a refractive index of at least 1.57, an Abbe number of at least 33 and an initial Barcol hardness of at least 1. More particularly, the present invention relates to certain polymerizable organic compositions comprising at least one radically polymerizable monomer having at least two ethylenically unsaturated groups, and a novel polythiol monomer.

A number of organic polymeric materials, e.g., plastics, have been developed as alternatives and replacements for glass in applications such as optical lenses, fiber optics, windows and automotive, nautical and aviation transparencies. As used herein, the term 'glass' is meant to refer to silica-based inorganic glass. These polymeric materials can provide advantages relative to glass, including, shatter resistance, lighter weight for a given application, ease of molding and ease of dying. Representative examples of such polymeric materials include, poly(methyl methacrylate), thermoplastic polycarbonate and poly[diethylene glycol bis (allylcarbonate)].

The refractive indices of many polymeric materials are generally lower than that of glass. For example, the refractive index of poly[diethylene glycol bis(allylcarbonate)] is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. If the degree of correction required is substantial, e.g., in the case of severe myopia, a lens fabricated from a low index polymeric material can become so thick as to negate any benefit of reduction in weight relative to an equivalent degree of correction obtained from a higher refractive index lens, e.g., a high index glass lens. In addition, thicker optical lenses are not aesthetically desirable.

It is known that polymeric materials having refractive indices greater than 1.50 can be prepared from monomers containing halogens and/or sulfur atoms, e.g., as described in U.S. Pat. No. 5,484,872. The materials from which lenses, and in particular optical lenses, are fabricated can be categorized by their refractive indices. As is known to those of ordinary skill in the art, low indices typically include indices of refraction of from less than 1.50 through 1.53; middle indices typically comprise indices of refraction of from 1.54 through 1.57; and high indices commonly include indices of refraction of 1.58 and greater. Lenses prepared from polymeric materials having high refractive indices typically also have lower Abbe numbers (also known as nu-values). Lower Abbe numbers are indicative of an increasing level of chromatic dispersion, which is typically manifested as an optical distortion at or near the rim of the lens.

It is accordingly desirable then to identify new polymerizable organic compositions, which can be used to prepare transparent polymerizates, particularly optical lenses, that possess a combination of high refractive index and adequately high Abbe numbers, e.g., preferably at least 33 and more preferably at least 35. It is further desirable that these polymeric materials also possess physical properties, and in particular thermal properties, that are at least equivalent to and preferably better than those of lower index polymeric materials.

Copending and commonly assigned U.S. patent application Ser. No. 09/008,222 filed Jan. 16, 1998 and entitled "Optical Resin Composition") discloses a polymerizable organic composition comprising an aromatic monomer having at least two vinyl groups, e.g., divinyl benzene, a polythiol monomer having at least two thiol groups, e.g., pentaerythritol tetrakis(2-mercaptoacetate), and an anhydride monomer having at least one ethylenically unsaturated group, e.g., methacrylic anhydride. Polymerizates of the disclosed composition are described as having a refractive index of at least 1.57 and an Abbe number of at least 33.

European patent publication number 598,551 A2 discloses a cross-linkable polymeric casting composition including an aromatic olefin monomer, e.g., divinyl benzene, and a di- or polythio compound, e.g., pentaerythritol tetrakis (3-mercaptopropionate). The casting composition is disclosed as further including a polymerizable co-monomer selected from the group including di-, tri-, tetra- and higher acrylates or methacrylates, e.g., poly(ethylene glycol) dimethacrylate.

International patent publication number WO 96/38486 discloses a cross-linkable polymeric casting composition including an effective amount of an acrylic or methacrylic monomer which provides high rigidity and a high Abbe number to the final product, e.g., a tricyclodecane dimethanol diacrylate or methacrylate, a di- or polythio compound, e.g., pentaerythritol tetrakis(3-mercaptopropionate), a di- or polyvinyl monomer, e.g., divinyl benzene, and optionally a polymerizable co-monomer, e.g., an epoxidized monomer or oligomer.

In accordance with the present invention, there is provided a polymerizable organic composition comprising:
(a) at least one polymerizable monomer having at least two ethylenically unsaturated groups;
(b) a polythiol monomer represented by the following general formula I,

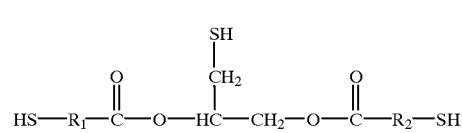

wherein $R_1$ and $R_2$ are each selected from the group consisting of straight or branched chain alkylene (usually containing from 1 to 20 carbon atoms, e.g., 1 to 10 carbon atoms, preferably 1 to 4 carbon atoms and more preferably 1 to 2 carbon atoms), cyclic alkylene (usually containing from 5 to 8 carbon atoms), phenylene and $C_1$–$C_9$ alkyl substituted phenylene; and
(c) optionally a polymerizable monomer having at least one ethylenically unsaturated group, which is different than monomer (a), selected from the group consisting of:
(i) a monoethylenically unsaturated monomer;
(ii) an anhydride monomer having at least one ethylenically unsaturated group, which is different than monomer (i); and
(iii) mixtures of monomers (c)(i) and (c)(ii). There is further provided a polymerizate of said polymerizable organic composition that has a refractive index of at least 1.57, as determined in accordance with American Standard Test Method (ASTM) number D 542-95, an Abbe number, i.e., a nu-value, of at least 33, as determined using an appropriate instrument, e.g., a Bausch & Lomb ABBE-3L Refractometer, and an initial Barcol hardness of at least 1, as determined in accordance with ASTM No. D 2583-95.

Other than in the operating examples, or where otherwise indicated, all numbers expressing quantities of ingredients or reaction conditions used herein are to be understood as modified in all instances by the term "about".

DETAILED DESCRIPTION OF THE INVENTION

The polymerizable organic composition of the present invention includes a polythiol monomer as described with reference to general formula I. As used herein, by "thiol", "thiol group", "mercapto" or "mercapto group" is meant an —SH group which is capable of forming a covalent bond with an ethylenically unsaturated group, e.g., a vinyl group. Not intending to be bound by any theory, it is believed that covalent bonds are formed between the thiol groups and ethylenically unsaturated groups of the monomers of the present invention by means of a thiol-ene reaction mechanism, as it is known to those of ordinary skill in the art.

With reference to general formula I, examples of straight or branched chain alkylene from which $R_1$ and $R_2$ may each be selected include, but are not limited to, methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Examples of cyclic alkylenes from which $R_1$ and $R_2$ may each be selected include, but are not limited to, cyclopentylene, cyclohexylene, cycloheptylene, cyclooctylene, and alkyl substituted derivatives thereof. The divalent linking groups $R_1$ and $R_2$ may also be selected from phenylene and alkyl substituted phenylene, e.g., methyl, ethyl, propyl, isopropyl and nonyl substituted phenylene. In a preferred embodiment of the present invention, $R_1$ and $R_2$ are each methylene or ethylene.

The polythiol monomer represented by general formula I may be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, e.g., methane sulfonic acid, with the concurrent removal of water or alcohol from the reaction mixture. A preferred polythiol monomer as represented by general formula I, for which $R_1$ and $R_2$ are both methylene, may be prepared as described herein in Example A.

As used herein, the polythiol monomer described and named with reference to general formula I, e.g., thiglycerol bis(2-mercaptoacetate), is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

The polymerizable organic composition of the present invention may optionally include at least one second polythiol monomer having at least two thiol groups, which is different than the polythiol monomer described with reference to general formula I. Examples of suitable second polythiol monomers include, but are not limited to, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), polyethylene glycol di(2-mercaptoacetate), polyethylene glycol di(3-mercaptopropionate) and mixtures of such polythiol monomers.

When one or more second polythiol monomers are used in the composition of the present invention, such monomers are typically present in an amount of not greater than 80% by weight, preferably not greater than 50% by weight, more preferably not greater than 25% by weight, and still more preferably not greater than 10% by weight, based on the combined total weight of the polythiol monomer represented by general FIG. 1 and the second polythiol monomer. In a preferred embodiment, the second polythiol monomer is selected from the group consisting of 2,2'-thiodiethanethiol, pentaerythritol tetrakis(2-mercaptoacetate), pentaerythritol tetrakis(3-mercaptopropionate) and mixtures thereof.

The polythiol monomer, inclusive of both the polythiol monomer represented by general formula I and the second polythiol monomer(s), is typically present in the polymerizable organic compositions of the present invention in an amount of at least 20% by weight, preferably at least 30% by weight, and more preferably at least 40% by weight, based on the total weight of the polymerizable organic composition. Also, the polythiol monomer is typically present in the composition in an amount of not greater than 60% by weight, preferably not greater than 55% by weight, and more preferably not greater than 50% by weight, based on the total weight of the polymerizable organic composition. The amount of the polythiol monomer present in the composition may range between any combination of these values, inclusive of the recited values.

Polymerizable organic compositions according to the present invention include also at least one polymerizable monomer having two or more ethylenically unsaturated groups, preferably a radically polymerizable monomer. As used herein, the term "ethylenically unsaturated group(s)" is meant to include allyl groups, vinyl groups and (meth) acryloyl groups. Further as used herein, the term "(meth) acryloyl groups" is meant to refer to acryloyl and methacryloyl groups.

The polymerizable monomer (a) is typically present in the polymerizable organic compositions of the present invention in an amount of at least 20% by weight, preferably at least 25% by weight, and more preferably at least 30% by weight, based on the total weight of the polymerizable organic composition. Also, monomer (a) is typically present in the composition in an amount of not greater than 80% by weight, preferably not greater than 65% by weight, and more preferably not greater than 50% by weight, based on the total weight of the polymerizable organic composition. The amount of polymerizable monomer (a) present in the composition may range between any combination of these values, inclusive of the recited values.

In an embodiment of the present invention, the aforedescribed polymerizable monomer (a) is an aromatic monomer having at least two vinyl groups. Examples of aromatic monomers that may be used in the polymerizable organic compositions of the present invention include, but are not limited to: divinyl benzene, e.g., 1,2-divinyl benzene, 1,3-divinyl benzene, 1,4-divinyl benzene and mixtures of structural isomers of divinyl benzene; diisopropenyl benzene, e.g., 1,2-diisopropenyl benzene, 1,3-diisopropenyl benzene, 1,4-diisopropenyl benzene and mixtures of structural isomers of diisopropenyl benzene; trivinyl benzene, e.g., 1,2,4-triethenyl benzene, 1,3,5-triethenyl benzene and mixtures of structural isomers of trivinyl benzene; divinyl naphthalene, e.g., 2,6-diethenyl naphthalene, 1,7-diethenyl naphthalene, 1,4-diethenyl naphthalene and mixtures of structural isomers of divinyl naphthalene; halogen substituted derivatives of divinyl benzene, diisopropenyl benzene, trivinyl benzene and divinyl naphthalene, e.g., 2-chloro-1,4-diethenyl benzene; and mixtures of such aromatic monomers. In a particularly preferred embodiment of the present invention, the aromatic monomer is divinyl benzene.

In another embodiment of the present invention, the polymerizable monomer (a) having at least two ethylenically unsaturated groups has (meth)acryloyl groups and is selected from the group consisting of:

(i) a monomer represented by the following general formula II,

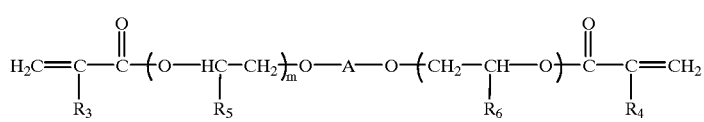

wherein m and n are each a positive number, the sum of m and n being from 0 to 70, preferably 2 to 40, and more preferably 5 to 20, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene (usually containing from 1 to 8 carbon atoms), cyclic alkylene (usually being 5 to 8 carbon atoms), phenylene, $C_1$–$C_9$ alkyl substituted phenylene, and a group represented by the following general formula III,

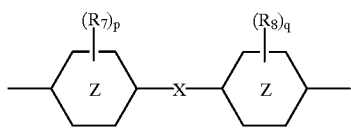

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —CH$_2$—, —CH=CH—, —C(CH$_3$)$_2$—, —C(CH$_3$)(C$_6$H$_5$)— or

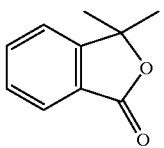

when

is the divalent benzene group, and X is 0, S, —CH$_2$—, or —C(CH$_3$)$_2$— when

is the divalent cyclohexane group;

(ii) a bis[(meth)acryloyl-terminated]poly(ethylene glycol) monomer, that is different than monomer (i), having a number average molecular weight from 200 to 2000 grams/mole; and (iii) a poly(meth)acryloyl terminated monomer represented by the following general formula IV,

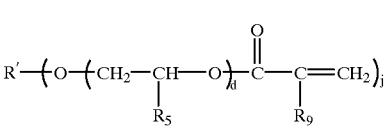

wherein R' is a polyvalent radical of a polyol, $R_9$ is hydrogen or methyl, $R_5$ is hydrogen or $C_1$ to $C_2$ alkyl, d is a number from 0 to 20, and j is a whole number from 3 to 6, preferably 3 to 4 and more preferably 3; and (iv) mixtures of monomers selected from the monomers (i), (ii) and (iii).

The polymerizable monomer (i) represented by general formula II may be prepared by methods that are well known in the art. One such commonly used method involves a two-step process, when the sum of m and n is greater than 0. In the first step, a polyol, e.g., 4,4'-isopropylidenediphenol, is reacted with an oxirane containing substance, for example ethylene oxide, propylene oxide, α-butylene oxide or β-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, a $C_1$ to $C_6$ alkyl methacrylate, an acrylic acid, a $C_1$ to $C_6$ alkyl acrylate, or a combination thereof. The second step results in the formation of the radically polymerizable monomer represented by general formula II. When the sum of m and n is 0, monomer (i) may be prepared by esterifiying or transesterfying a polyol, e.g., 4,4'-isopropylidenediphenol, with an alpha-beta unsaturated acid or ester such as methacrylic acid, a $C_1$ to $C_6$ alkyl methacrylate, an acrylic acid, a $C_1$ to $C_6$ alkyl acrylate, or a combination thereof.

Examples of polyols suitable for use in preparing monomer (i) represented by general formula II, include, but are not limited to: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; cyclic alkylene diols such as 1,2-cyclohexanediol, 1,3-cyclohexanediol and 1,4-cyclohexanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4-oxybisphenol; 4,4'-dihydroxybenzophenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

In a preferred embodiment of the present invention, with reference to general formulas II and III, X is —C(CH$_3$)$_2$—,

represents a divalent benzene group, p and q are each 0, $R_3$ and $R_4$ are each methyl, $R_5$ and $R_6$ are each hydrogen, and the sum of m and n is from 5 to 20.

Polymerizable monomer (ii) is different than monomer (i) and can be prepared as is known in the art from an esterification or transesterification reaction between poly(ethylene glycol) and an alpha-beta unsaturated acid or ester such as methacrylic acid, a $C_1$ to $C_6$ alkyl methacrylate, acrylic acid, a $C_1$ to $C_6$ alkyl acrylate, or a combination thereof. The bis[(meth)acryloyl-terminated]poly(ethylene glycol) monomer, preferably has a number average molecular weight from 200 to 1200, more preferably from 500 to 700, grams/mole, as determined by gel permeation chromatography using a polystyrene standard. A particularly preferred monomer (ii) is a bismethacrylate of polyethylene glycol, having a number average molecular weight of 600 grams/mole.

Polymerizable monomer (iii), as previously described with reference to general formula IV, may be prepared by methods that are well known in the art. One such commonly used method involves a two step process, when d is greater than 0. In the first step, a polyol, e.g., trimethylolpropane, is reacted with an oxirane containing substance, for example ethylene oxide, propylene oxide, α-butylene oxide or β-butylene oxide to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, a $C_1$ to $C_6$ alkyl methacrylate, acrylic acid, a $C_1$ to $C_6$ alkyl acrylate, or a combination thereof. The second step results in the formation of polymerizable co-monomer (iii). When d is 0, co-monomer (iii) may be prepared by esterifiying or transesterfying a polyol, e.g., trimethylolpropane, with an alpha-beta unsaturated acid or ester such as methacrylic acid, a $C_1$ to $C_6$ alkyl methacrylate, an acrylic acid, a $C_1$ to $C_6$ alkyl acrylate, or a combination thereof.

Examples of polyols suitable for use in preparing polymerizable monomer (iii) include, but are not limited to, glycerol, trimethylolpropane, 1,3,5-tris(2-hydroxyethyl) isocyanurate, di-trimethylolpropane, pentaerythritol and dipentaerythritol. A particularly preferred polymerizable monomer (iii) may be defined with reference to general formula IV wherein R' is a radical of pentaerythritol, d is 0, j is 3 or 4 and $R_9$ is hydrogen.

As used herein, and with reference to general formula IV, the phrase "R' is a polyvalent radical of a polyol" is meant to refer to the polyvalent residue of the polyol used in preparing polymerizable monomer (iii). For example, in the case of pentaerythritol tetraacrylate (for which d is 0, j is four and $R_9$ is hydrogen), R' is the tetravalent radical of pentaerythritol, i.e., tetramethylenemethane. In the case of trimethylolpropane triacrylate (for which d is 0, j is 3 and $R_9$ is hydrogen) R' is the trivalent radical of trimethylolpropane, i.e., 1,1,1-trimethylenepropane.

In a further embodiment of the present invention, the polymerizable monomer having two or more ethylenically unsaturated groups has allyl groups and is represented by the following general formula V,

wherein R is a radical derived from a polyol, $R_{10}$ is a radical derived from an allyl or substituted allyl group and i is a whole number from 2 to 6.

The polymerizable monomer represented by general formula V, may be further described as a polyol(allyl carbonate) monomer. Polyol(allyl carbonate) monomers that may be used in the aforedescribed polymerizable organic composition are allyl carbonates of linear or branched aliphatic or aromatic liquid polyols, e.g., aliphatic glycol bis(allyl carbonate) compounds and alkylidene bisphenol bis(allyl carbonate) compounds. These monomers may also be described as unsaturated polycarbonates of polyols, e.g., glycols and bisphenols. The polyol(allyl carbonate) monomer may be prepared by procedures well known in the art, e.g., as described in U.S. Pat. Nos. 2,370,567 and 2,403,113.

In reference to general formula V, $R_{10}$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. The $R_{10}$ radical may be represented by the following general formula VI:

$$H_2C=C(R_{11})-CH_2-  \qquad VI$$

wherein $R_{11}$ is hydrogen, halogen or a $C_1$ to $C_4$ alkyl group. Most commonly, $R_{11}$ is hydrogen and consequently $R_{10}$ is the unsubstituted allyl group, $H_2C=CH-CH_2-$, In reference to general formula V, R is a polyvalent radical derived from a polyol which can be an aliphatic, cycloaliphatic or an aromatic polyol containing 2, 3, 4, 5 or 6 hydroxy groups. Typically, the polyol contains 2 hydroxy groups, i.e., a glycol or bisphenol. The aliphatic polyol may be linear or branched and contain from 2 to 10 carbon atoms. Commonly, the aliphatic polyol is an alkylene glycol having from 2 to 4 carbons atoms, ethylene glycol, propylene glycol, trimethylene glycol, tetramethylene glycol, or a poly($C_2$–$C_4$) alkylene glycol, e.g., diethylene glycol, triethylene glycol, etc. Other useful polyols include aromatic polyols such as bisphenols, e.g., 4,4'-isopropylidenediphenol, and cycloaliphatic polyols such as biscyclohexanols, e.g., 4,4'-isopropylidenebiscyclohexanol.

Specific examples of polyol(allyl carbonate) monomers that may be used in the polymerizable organic compositions of the present invention, include, but are not limited to, ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis(allyl carbonate), trimethylene glycol bis(2-ethylallyl carbonate), pentamethylene glycol bis(allyl carbonate), 4,4'-isopropylidenediphenol bis(allyl carbonate), and 4,4'-isopropylidenebiscyclohexanol bis(allyl carbonate). The preferred polyol(allyl carbonate) monomer is 4,4'-isopropylidenediphenol bis(allyl carbonate).

A more detailed description of polyol(allyl carbonate) monomers suitable for use in the present invention is found in U.S. Pat. No. 4,637,698 at column 3, line 33 through column 5, line 61. That disclosure is hereby incorporated by reference and is summarized above. As used in the present description with reference to general formula V, the term polyol(allyl carbonate) monomer or like names, e.g., diethylene glycol bis(allyl carbonate), is intended to mean and include the named monomers or prepolymers thereof and any related monomer or oligomer species found with said monomer as a consequence of the process used to synthesize the monomer.

Polymerizable organic compositions according to the present invention may optionally include a polymerizable monoethylenically unsaturated monomer, i.e., a monomer having only a single ethylenically unsaturated group, as described with reference to monomer (c)(i) above, preferably a radically polymerizable monomer. Examples of such monomers include, but are not limited to, acrylic acid, methacrylic acid, esters of acrylic acid such as methyl or ethyl acrylate and 2-hydroxyethyl acrylate, esters of methacrylic acid, such as methyl or ethyl methacrylate, phenoxyethyl methacrylate, isobornyl methacrylate, cyclohexyl methacrylate and 2-hydroxyethyl methacrylate, vinyl esters such as vinyl acetate, styrene and vinyl chloride. Preferred monoethylenically unsaturated monomers include, methyl methacrylate, isobornyl methacrylate, phenoxyethyl methacrylate, cyclohexyl methacrylate, vinyl chloride and mixtures thereof. If used in the polymerizable composition, monomer (c)(i) is typically present in an amount of not greater than 30% by weight, preferably not greater than 20% by weight, and more preferably not greater than 10% by weight, based on the total weight of the polymerizable composition.

Further optionally included in the compositions of the present invention is an anhydride monomer having at least one polymerizable ethylenically unsaturated group, preferably a radically polymerizable group, which is described in the discussion of monomer (c)(ii) above. Specific examples of suitable anhydride monomers include, but are not limited to, methacrylic anhydride, acrylic anhydride, maleic anhydride, 1-cyclopentene-1,2-dicarboxylic anhydride, itaconic anhydride and mixtures of such anhydride monomers. If used in the polymerizable composition, anhydride monomer (c)(ii) is typically present in an amount of not greater than 40% by weight, preferably not greater than 35% by weight and more preferably not greater than 30% by weight, based on the total weight of the polymerizable composition.

Polymerization of the polymerizable organic composition of the present invention may be accomplished by adding to the composition an initiating amount of material capable of generating free radicals, such as organic peroxy compounds or azobis(organonitrile) compounds, i.e., an initiator. Methods for polymerizing compositions having therein monomers containing radically polymerizable groups are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate. A particularly preferred thermal initiator is 1,1-di-(t-butyl peroxy)-3,3,5-trimethylcyclohexane, which is commercially available from Elf Atochem under the tradename LUPERSOL® 231.

Examples of suitable azobis(organonitrile) compounds, that may be used as thermal polymerization initiators include: azobis(isobutyronitrile) and azobis(2,4-dimethylvaleronitrile).

The amount of thermal polymerization initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred peroxy compound, 1,1-di-(t-butyl peroxy)-3,3,5-trimethylcyclohexane, typically between 0.01 and 3.0 parts of that initiator per 100 parts of monomers (phm) present in the polymerizable organic composition may be used. More usually, between 0.05 and 1.0 phm is used to initiate the polymerization. Typically, the thermal cure cycle involves heating the polymerizable organic composition in the presence of the initiator from room temperature to 85° C. to 130° C. over a period of from 2 hours to 48 hours.

Photopolymerization of the polymerizable organic composition according to the present invention may be carried out in the presence of a photopolymerization initiator using ultraviolet light, visible light, or a combination thereof. Examples of suitable photopolymerization initiators include benzoin, benzoin methyl ether, benzoin isobutyl ether, benzophenone, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixanthone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. A preferred photopolymerization initiator is 2,4,6-trimethylbenzoyldiphenylphosphine oxide. The photopolymerization initiator is typically used in an amount from 0.01% to 2% by weight, based on the total weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator and/or the consequent cure cycle should be adequate to produce a polymerizate according to the present invention which has an initial (zero second) Barcol hardness of at least 1, preferably at least 4, e.g., from 4 to 35.

It should be understood that the polymerizable organic composition of the present invention may be polymerized in the absence of a polymerization initiator. In particular, photopolymerization of the polymerizable organic composition of the present invention may be achieved in the absence of any externally added photopolymerization or thermal initiators.

Various conventional additives may be incorporated with the polymerizable organic composition of the present invention. Such additives may include light stabilizers, heat stabilizers, antioxidants, ultraviolet light absorbers, mold release agents, static (non-photochromic) dyes, pigments, polymerization inhibitors to promote stability during storage, and flexibilizing additives that are not radically polymerizable, e.g., alkoxylated phenol benzoates and poly (alkylene glycol) dibenzoates. Antiyellowing additives, e.g., 3-methyl-2-butenol, organo pyrocarbonates and triphenyl phosphite (CAS registry no. 101-02-0), may also be added to polymerizable organic compositions of the present invention to enhance resistance to yellowing. Such additives are typically present in the compositions of the present invention in amounts totaling less than 10% by weight, preferably less than 5% by weight, and more preferably less than 3% by weight, based on the total weight of the polymerizable composition.

It is also contemplated that a polymerization moderator, or mixtures of polymerization moderators, may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable organic composition of the present invention in an amount from 0.01% to 10% by weight, preferably from 0.1% to 8% by weight and more preferably from 0.3% to 5% by weight, based on the total weight of the polymerizable organic composition.

Polymerizates obtained from polymerization of polymerizable organic compositions of the present invention will be solid, and preferably transparent, e.g., suitable for optical or ophthalmic applications. The polymerizates of the present invention will also have a refractive index of at least 1.57, preferably at least 1.58 and more preferably at least 1.59, adequately high Abbe numbers, e.g., an Abbe number of at least 33 and preferably at least 35, and an initial (zero second) Barcol hardness of at least 1. Solid articles that may be prepared from polymerizable organic compositions of the present invention include, but are not limited to, optical lenses, such as plano and ophthalmic lenses, sun lenses, windows, automotive transparencies, e.g., windshields, sidelights and backlights, and aircraft transparencies, etc.

The monomers comprising the polymerizable organic composition of the present invention are selected and are present in amounts that allow the preparation of a polymerizate therefrom, which possesses the above listed characteristics. For example, in a particularly preferred embodiment of the present invention, the polymerizable organic composition comprises: (a) an aromatic monomer having at least two vinyl groups as previously described; (b) a polythiol monomer as described with reference to general formula I; and (c) an anhydride monomer having at least one ethylenically unsaturated group as previously described. In this particularly preferred embodiment the polymerizable organic composition typically comprises: from 20% to 80% by weight, preferably from 25% to 65% by weight, and more preferably from 30% to 50% by weight of the aromatic monomer, e.g., divinyl benzene; from 20% to 60% by weight, preferably from 30% to 55% by weight, and more preferably from 40% to 50% by weight of the polythiol monomer as described with reference to general formula I; and from 3% to 40% by weight, preferably from 6% to 35% by weight, and more preferably from 10% to 30% by weight of the anhydride monomer, e.g., methacrylic anhydride, all percent weights being based on the total weight of the composition, and all ranges being inclusive of the recited values.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates, which are described in, for example, U.S. Pat. No. 3,361,706. Fulgides and fulgimides, e.g. the 3-furyl and 3-thienyl fulgides and fulgimides, are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film or polymer layer; and applying the photochromic substance as part of a coating or polymer layer placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the polymerizable organic compositions of the present invention prior to curing. However, when this is done it is preferred that the photochromic substance(s) be resistant to potentially adverse interactions with initiator(s) that may be present and/or the polythiol monomer and the sulfide linkages that form within the polymerizate. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the polymerizable organic compositions of the present invention prior to curing.

The present invention is more particularly described in the following examples, which are intended to be illustrative only, since numerous modifications and variations therein will be apparent to those skilled in the art. Unless otherwise specified, all parts and percentages are by weight.

EXAMPLE A

A polythiol monomer, for which $R_1$ and $R_2$ are each methylene with reference to general formula I, i.e., thioglycerol bis(mercaptoacetate), was prepared from the ingredients listed in Table 1.

TABLE 1

| Ingredient | Amount (grams) |
|---|---|
| Charge 1 | |
| 3-mercapto-1,2-propanediol | 1995 |
| 2-mercaptoacetic acid | 2333 |
| methane sulfonic acid | 14.2 |
| Charge 2 | |
| aqueous ammonia* | 4218 |

*An aqueous solution of 5% by weight ammonia.

Charge 1 was added to a five liter round bottom flask equipped with a magnetic stirrer, a thermocouple and heating mantle coupled through a temperature feed-back control device, and a vacuum distillation column. A vacuum of from 5 to 10 millimeters (mm) of Hg was drawn and the reaction mixture was heated to and held at 70° C. for a period of 4 to 5 hours while water was collected from the distillation column.

When no more water was observed to be collected from the distillation column, the reaction mixture was cooled to room temperature and transferred to a six liter round bottom flask equipped with a motor driven stir-blade, a thermocouple and a water cooled jacket. Charge 2 was added to the mixture, which was then stirred for 30 to 45 minutes with an accompanying exotherm of from 10° C. to 20° C. Upon cooling to room temperature, the reaction mixture was left standing to allow for the accumulation of an upper layer of ammonia, which was removed by suctioning with a pipette. The remaining lower layer was washed three times each with two liters of deionized water. Vacuum stripping of water from the washed layer yielded 1995 grams of thioglycerol bis(mercaptoacetate) in the form of a yellowish oil having a refractive index of 1.5825.

EXAMPLES 1 and 2

Table 2 describes two polymerizable monomer compositions according to the present invention. Example 1 represents a photopolymerizable composition and Example 2 represents a thermally polymerizable composition.

TABLE 2

| | Example | |
|---|---|---|
| Ingredients, Parts | 1 | 2 |
| DVB monomer [a] | 32.5 | 37 |
| TGBMA monomer [b] | 34 | 23.5 |
| PTMA monomer [c] | 8.5 | 0 |
| PTMP monomer [d] | 0 | 23.5 |
| MA monomer [e] | 25 | 16 |
| LUPERSOL ® 231 initiator [f] | 0 | 0.4 |

[a] divinylbenzene monomer having a purity of 93% by weight.
[b] thioglycerol bis(2-mercaptoacetate) prepared as described in Example A.
[c] pentaerythritol tetrakis (2-mercaptoacetate) monomer
[e] pentaerythritol tetrakis (3-mercaptopropionate) monomer.
[e] methacrylic anhydride monomer.
[f] LUPERSOL ® 231 - an initiator having the reported chemical formula of 1,1-di(tert-butylperoxy)-3,3,5-trimethylcyclohexane, CAS Registry No. 6731-36-8, which is available commercially from Elf Atochem.

Photopolymerized cast sheets of the polymerizable monomer composition represented by Example 1 of Table 2 were made in the following manner. The monomer composition was added to a suitable vessel and mixed using a magnetic stir plate and magnetic stir bar at ambient temperature. The mixed monomer composition was then poured into ultraviolet (UV) light transmissive glass molds having interior dimensions of 15.24×15.24×0.32 cm.

The contents of the filled molds were photo-cured in the following manner. (1) A filled mold was passed several times beneath an ultraviolet (UV) light source until its contents were observed by visual inspection to have gelled. (2) Each 15.24×15.24 cm side of the glass mold was next passed an additional four times beneath the UV light source. (3) The mold was then placed in a 120° C. electric oven for one hour. The UV light source used was a FUSION SYSTEMS® D-Bulb, which was positioned at a distance of 15 cm (6 inches) above the glass molds. The glass molds were passed beneath the UV light source at a linear rate of 91 cm (3 ft)/minute using a model No. C636R conveyor belt system available commercially from LESCO Inc. A single pass beneath the UV light source as described was found to impart 4.9 Joules/$cm^2$ of UV energy to the interior of the glass molds used. Physical properties of the cast sheets were measured and the results are summarized in Table 3.

Thermally polymerized cast sheets of the polymerizable monomer composition represented by Example 2 of Table 2 were made in the following manner. The monomers of Example 2 were first charged to a suitable vessel followed by the addition of the LUPERSOL® 231 initiator. The resulting initiated polymerizable monomer composition was mixed using a magnetic stir plate and magnetic stir bar at ambient room temperature. The mixed monomer composition was then poured into glass molds having interior dimensions of 15.24×15.24×0.32 cm. The filled molds were cured according to the following sequential thermal cure cycle: (1) isothermal hold at 55° C. for 10 hours; (2) heated from 55° C. to 125° C. at a constant rate over a period of 9.5 hours; (3) isothermal hold at 125° C. for one hour; and (4) cooled from 125° C. to 80° C. at a constant rate over a period of 1.5 hours, end of cycle. Physical properties of the cast sheets were measured and the results are summarized in Table 3.

TABLE 3

| | Physical Data | |
|---|---|---|
| | | Example |
| Physical Test | 1 | 2 |
| Heat Distortion Temperature (° C. at 10 mils) [g] | 83 | 82 |
| Total Deflection (mils) @ 130° C. [h] | 93 | 80 |
| Refractive Index [i] ($n_D^{20}$) | 1.5935 | 1.5934 |
| Abbe Number | 36 | 36 |
| % Transmittance [j] | 91.3 | 91.2 |
| % Haze [k] | 1.31 | 0.69 |
| Density at 22° C. (g/cc) | 1.282 | 1.262 |

TABLE 3-continued

Physical Data

| Physical Test | Example | |
|---|---|---|
| | 1 | 2 |
| Barcol Hardness (0 Seconds) [1] | 46 | 43 |
| Barcol Hardness (15 Seconds) [1] | 43 | 40 |

[g] Heat Distortion Temperature is the temperature at which the test specimen was observed to have a deflection of 10 mils (254 microns), and was determined in accordance with ASTM D 648–95 using a Custom Scientific Instruments Model HDV3 DTUL/Vicat Softening Point Apparatus.
[h] Total Deflection at 130° C. is the total deflection (in units of mils) of the test specimen that was observed at this temperature, and was determined in accordance with ASTM D 648–95 using a Custom Scientific Instruments Model HDV3 DTUL/Vicat Softening Point Apparatus.
[i] Refractive Index $n_D$ was determined in accordance with ASTM D542–95, using a Bausch & Lomb Abbe-3L Refractometer.
[j] Percent Transmittance was determined in accordance with ASTM D 1003–95, using a HunterLab model ColorQuest II spectrophotometer.
[k] Percent Haze was determined in accordance with ASTM D 1003–95 using a HunterLab model ColorQuest II spectrophotometer.
[l] Barcol Hardness was determined in accordance with ASTM - D 2583–95, taking scale readings immediately after the Barcol impresser point penetrated the specimen, i.e., at 0 seconds, and 15 seconds thereafter.

The data of Table 3 shows that polymerizates obtained by either UV-curing or thermal-curing of polymerizable monomer compositions of the present invention have good physical properties, e.g., thermal properties, coupled with high refractive indices and Abbe numbers.

The present invention has been described with reference to specific details of particular embodiments thereof. It is not intended that such details be regarded as limitations upon the scope of the invention except insofar as and to the extent that they are included in the accompanying claims.

We claim:

1. A polymerizable organic composition comprising:
    (a) at least one polymerizable monomer having at least two ethylenically unsaturated groups;
    (b) a polythiol monomer represented by the following general formula,

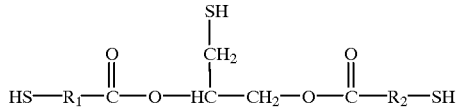

wherein $R_1$ and $R_2$ are each selected from the group consisting of straight or branched chain alkylene, cyclic alkylene, phenylene and $C_1$–$C_9$ alkyl substituted phenylene; and
    (c) optionally a polymerizable monomer having at least one ethylenically unsaturated group, which is different than monomer (a), selected from the group consisting of:
        (i) a monoethylenically unsaturated monomer;
        (ii) an anhydride monomer having at least one ethylenically unsaturated group, which is different than monomer (i); and
        (iii) mixtures of monomers (i) and (ii), provided that a polymerizate of said polymerizable organic composition has a refractive index of at least 1.57, an Abbe number of at least 33 and an initial Barcol hardness of at least 1.

2. The polymerizable organic composition of claim 1 wherein said polymerizable monomer (a) is an aromatic monomer having at least two vinyl groups and is selected from the group consisting of divinyl benzene, diisopropenyl benzene, trivinyl benzene, divinyl naphthalene, halogen substituted derivatives of divinyl benzene, diisopropenyl benzene, trivinyl benzene, divinyl naphthalene and mixtures thereof.

3. The polymerizable organic composition of claim 2 wherein said aromatic monomer is divinyl benzene.

4. The polymerizable organic composition of claim 1 wherein said polymerizable monomer (a) has (meth)acryloyl groups and is selected from the group consisting of:
    (i) a monomer represented by the following general formula,

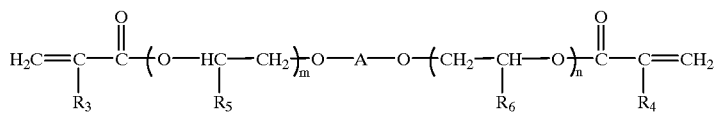

wherein m and n are each a positive number, the sum of m and n being from 0 to 70, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene, cyclic alkylene, phenylene, $C_1$–$C_9$ alkyl substituted phenylene, and a group represented by the following general formula,

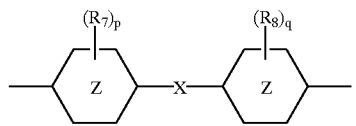

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$) (C$_6$H$_5$)— or

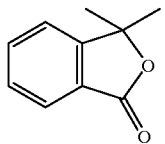

when

is the divalent benzene group, and X is O, S, —CH$_2$—, or —C(CH$_3$)$_2$— when

is the divalent cyclohexane group;

(ii) a bis[(meth)acryloyl-terminated]poly(ethylene glycol) monomer, that is different than monomer (i), having a number average molecular weight from 200 to 2000 grams/mole;

(iii) a poly(meth)acryloyl terminated monomer represented by the following general formula,

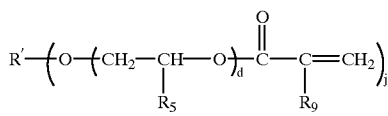

wherein R' is a polyvalent radical of a polyol, R$_9$ is hydrogen or methyl, R$_5$ is hydrogen or C$_1$ to C$_2$ alkyl, d is a number from 0 to 20, and j is a whole number from 3 to 6; and (iv) mixtures of monomers selected from monomers (i), (ii) and (iii).

5. The polymerizable organic composition of claim 4 wherein X is —C(CH$_3$)$_2$—,

represents a divalent benzene group, p and q are each 0, R$_3$ and R$_4$ are each methyl, R$_5$ and R$_6$ are each hydrogen, the sum of m and n is from 5 to 20, R' is a radical of pentaerythritol, j is 3, R$_9$ is hydrogen and d is 0.

6. The polymerizable organic composition of claim 1 wherein said polymerizable monomer (a) has allyl groups and is represented by the following general formula,

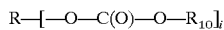

wherein R is a radical derived from a polyol, R$_{10}$ is a radical derived from an allyl or substituted allyl group and i is a whole number from 2 to 6.

7. The polymerizable organic composition of claim 6 wherein the polyol from which R is derived is 4,4'-isopropylidenediphenol, i is 2, and R$_{10}$ is a radical derived from an allyl group.

8. The polymerizable organic composition of claim 1 wherein R$_1$ and R$_2$ are each selected from the group consisting of methylene and ethylene.

9. The polymerizable organic composition of claim 1 further comprising a second polythiol monomer having at least two thiol groups, which is different than said polythiol monomer (b).

10. The polymerizable organic composition of claim 9 wherein said second polythiol monomer is selected from the group consisting of 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate) and mixtures of said polythiol monomers.

11. The polymerizable organic composition of claim 1 wherein said monoethylenically unsaturated monomer (c)(i) is selected from the group consisting of styrene, methyl methacrylate, isobornyl methacrylate, phenoxyethyl methacrylate, cyclohexyl methacrylate, vinyl acetate, vinyl chloride and mixtures of said monomers.

12. The polymerizable organic composition of claim 1 wherein said anhydride monomer (c)(ii) is selected from the group consisting of methacrylic anhydride, acrylic anhydride, maleic anhydride, 1-cyclopentene-1,2-dicarboxylic anhydride, itaconic anhydride and mixtures of said monomers.

13. A polymerizable organic composition comprising:
(a) an aromatic monomer having at least two vinyl groups;
(b) a polythiol monomer represented by the following general formula,

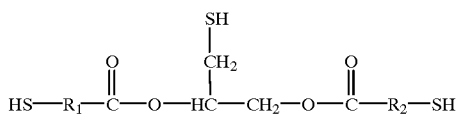

wherein R$_1$ and R$_2$ are each selected from the group consisting of straight or branched chain alkylene, cyclic alkylene, phenylene and C$_1$–C$_9$ alkyl substituted phenylene; and (c) an anhydride monomer having at least one ethylenically unsaturated group, provided that a polymerizate of said polymerizable organic composition has a refractive index of at least 1.57, an Abbe number of at least 33 and an initial Barcol hardness of at least 1.

14. The polymerizable organic composition of claim 13 wherein said aromatic monomer is selected from the group consisting of divinyl benzene, diisopropenyl benzene, trivinyl benzene, divinyl naphthalene, halogen substituted derivatives of divinyl benzene, diisopropenyl benzene, trivinyl benzene divinyl naphthalene and mixtures of said aromatic monomers.

15. The polymerizable organic composition of claim 13 wherein said anhydride monomer is selected from the group consisting of methacrylic anhydride, acrylic anhydride, maleic anhydride, 1-cyclopentene-1,2-dicarboxylic anhydride, itaconic anhydride and mixtures of said anhydride monomers.

16. The polymerizable organic composition of claim 13 wherein said aromatic monomer is divinyl benzene, $R_1$ and $R_2$ are each selected from the group consisting of methylene and ethylene, and said anhydride monomer is methacrylic anhydride.

17. The polymerizable organic composition of claim 13 further comprising a second polythiol monomer having at least two thiol groups, which is different than said polythiol monomer (b).

18. The polymerizable organic composition of claim 17 wherein said second polythiol monomer is selected from the group consisting of 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate) and mixtures of said polythiol monomers.

19. The polymerizate of claim 1.

20. The polymerizate of claim 13.

21. A photochromic article comprising:

(a) the polymerizate of claim 1; and (b) a photochromic amount of organic photochromic substance.

22. A photochromic article comprising:

(a) the polymerizate of claim 13; and (b) a photochromic amount of organic photochromic substance.

23. The photochromic article of claim 22 wherein the organic photochromic substance is selected from the group consisting of spiro(indoline)naphthoxazines, spiro(indoline) benzoxazines, benzopyrans, naphthopyrans, chromenes, organo-metal dithizonates, fulgides and fulgimides and mixtures of said organic photochromic substances.

* * * * *